United States Patent [19]

Kimura et al.

[11] 3,804,566
[45] Apr. 16, 1974

[54] DIE OR MOULD FOR USE IN FORMING A RUBBER OR PLASTIC MATERIAL

[75] Inventors: Takashi Kimura; Noboru Nakagawa; Hiroshi Hamamoto, all of Nagoya, Japan

[73] Assignee: Kabushiki Kaisha Toyota Chuo Kenkyusho, Nagoya-shi, Aichi-ken, Japan

[22] Filed: May 5, 1972

[21] Appl. No.: 250,630

[30] Foreign Application Priority Data
May 15, 1971  Japan............................... 46-32686

[52] U.S. Cl.................. 425/28, 425/812, 425/420, 249/141
[51] Int. Cl.............................................. B29c 1/00
[58] Field of Search.................. 425/405, 420, 812; 249/141

[56] References Cited
UNITED STATES PATENTS
3,329,198  7/1967  Manning et al.................... 425/812

FOREIGN PATENTS OR APPLICATIONS
455,897  2/1970  Japan................................... 425/812
218,991  11/1958  Australia............................. 249/141
1,117,281  6/1968  Great Britain....................... 425/812

Primary Examiner—J. Howard Flint, Jr.
Attorney, Agent, or Firm—Berman, Bishoff & Platt

[57] ABSTRACT

A die or mould for use in forming a rubber or plastic material, and which includes cylindrical filters as air venting means. The filters include a plurality of linear air venting holes of a diameter of from 0.01 mm. to 0.1 mm., passing therethrough and are mounted in through-holes penetrating the die or mould body. During forming of the rubber or plastic material in the die or mould, the air trapped is vented to the exterior of the mould through the filters, and the material being moulded does not clot the air venting holes.

6 Claims, 5 Drawing Figures

DIE OR MOULD FOR USE IN FORMING A RUBBER OR PLASTIC MATERIAL

BACKGROUND OF THE INVENTION

1. FIELD OF THE INVENTION:

This invention relates to dies or moulds for use in forming a rubber or plastic material, which dies or moulds have linear air venting holes of a minute diameter therethrough.

2. DESCRIPTION OF THE PRIOR ART

In general, for successively forming rubber articles such as tires, or ordinary utensils, or those made from plastics, by forming dies or moulds, there arises a need to remove the air being trapped between the mould surface and the rubber or plastic material being formed in a cavity of said mould, so as to achieve close contact between the moulding material and the cavity wall.

For this purpose, it has been a practice to provide small holes as air venting means in the die or mould body. However, this results in the formation of minute projections on the surface of the moulded material due to the ingress of the material into the air venting holes during forming due to the forming pressure. This further leads to disadvantages in that such minute projections are cut and remain inside the venting holes at the time when the formed material is removed from the dies or moulds, with the resultant clogging of the venting holes. This, in turn, engenders a need for complicated and time consuming subsequent operations to remove such minute projections from the formed material, or to remove such cut projections from the air venting holes.

These shortcomings will be described in more detail later by way of example of moulds for vulcanizing and forming tires with specific reference to the drawings.

Another means for venting air is to provide porous materials in the holes penetrating a die or mould body. Pores of the porous material are sufficiently small to reduce the ingress of a forming material into said pores. However, the pores of said porous material are so complicated that the air trapped cannot be vented quickly through said complicated pores. Also, when the forming material happens to enter said pores, said forming material will clog the pores because of their complicated shape.

SUMMARY OF THE INVENTION

The primary object of the present invention is to avoid the above briefly described shortcomings in forming dies or moulds for rubber or plastic items by providing air venting means which has therethrough a plurality of linear air venting holes of an extremely small diameter adapted to smoothly discharge the trapped air from the die or mould cavity.

Another object of the present invention is to provide air venting means which prevents the formation of minute projections on the formed article.

BRIEF DESCRIPTION OF THE DRAWINGS

These and other objects of this invention will become apparent from the following description when read in conjunction with the accompanying drawings wherein.

DETAILED EXPLANATION OF THE INVENTION

Figure 3:
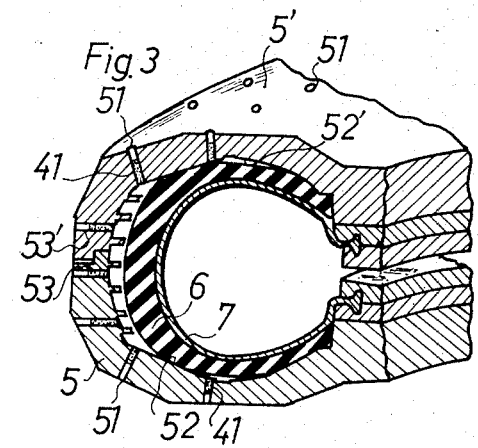
FIG. 3 is a partly perspective and partly cross-sectional view of tire forming moulds including filters as shown in FIG. 2.

Before explaining the present invention, a more detailed description of conventional tire forming moulds and moulding processes is made with respect to FIG. 3 of the drawings.

Generally, conventional tire forming moulds consist of a lower mould 5 having a mould surface 52 and an upper mould 5' having a mould surface 52' with the mould body or wall having therethrough a plurality of air venting holes (like 51, but not shown in FIG. 3) having a diameter of from 1.0 to 2.0 mm. In the forming operation, there is inserted a rubber material 6 between the upper and lower moulds prior to the vulcanization treatment. In the next step, steam under high pressure and hot water (about 160°C) are introduced into a bladder 7 for expanding the same, so that the rubber material 6 is urged onto the mould surfaces 52 and 52' due to the high pressure and high temperature afforded by the aforesaid steam and hot water for the purpose of vulcanizing and forming said material to the shape of a tire.

During the above-mentioned operation, the air being trapped between the rubber material 6 and mould surfaces 52 and 52' is discharged through a plurality of air vents (not shown) to the atmosphere with the accompanying disadvantage that a part of such rubber material is forced, due to the aforesaid pressure, into the air vents. Accordingly, the tire is formed with a plurality of minute projections at such positions on its surfaces as correspond to the positions of the air vents. To make matters worse, these minute projections often are cut and remain in the air vents when the tire is removed from the moulds, thereby clogging of the air vents. Such clogged condition requires complicated and time consuming subsequent operations to remove the minute projections from the surface of the tire or to remove the minute projections from the vents before starting the next forming operation. These shortcomings result in failure to attain efficient mass production and cost savings. Such shortcomings also occur in forming other rubber or plastic products. Air vents having substantially large diameters are responsible for such clogging and for the formation of minute projections on the surface of the formed product, while the air vents having substantially small diameters will not cause the ingress of the forming material into the air vents to thereby eliminate the possibility of such clogging, or formation of such minute projections.

According to one conventional moulding process, the diameter of the air vents used cannot be reduced below 1.0 to 2.0 mm., because the air venting holes have to be formed by drilling into the mould wall having a relatively large thickness, and the diameter of such a hole will necessarily be equal to the diameter of the drill used, which can have a minimum diameter of 1 mm.

The present invention provides dies or moulds for forming a rubber, or plastic material, which comprise, for air venting purpose, cylindrical filters made from a sintered material, each of said filters having therethrough a plurality of linear air venting holes of an extremely small diameter, said holes extending substantially parallel to the axis of the filter. The filters are mounted in the dies, or moulds in such a manner that one face of the filter is open to the forming cavity of the die.

The sintered filter body, serving as air venting means, may be advantageously produced according to the process disclosed in co-pending U.S. Pat. application Ser. No. 142,166, now Pat. No. 3,751,271, using a metal powder, or ceramic powder. First, a plurality of metal wires or fabric wires that melt or burn at a temperature below the sintering temperature of the powder used, are disposed in parallel relation to each other, and the powder is charged therearound, and then, such wires and powder are heated to a sintering temperature. During the sintering operation, the metal wires or fabric wires melt and infiltrate into the sintered body, or burn off to leave holes therein. Thus, the obtained filter constitutes a sintered matrix made of a metal, or ceramic, powder and infiltrated with copper.

According to the process of the present invention, it is possible to provide a sintered filter body with air venting hole having minute diameters as small as 0.01 mm., or less. The preferred size of the venting holes is a diameter ranging from 0.1 mm. to 0.01 mm. With air venting holes less than 0.01 mm. in diameter, insufficient gas, or air venting results due to the great flow resistance of the fluid passing through the venting holes, whereas with venting holes of a diameter greater than 0.1 mm., there arises the possibility of the rubber, or plastic material entering the venting holes, even though no substantial pressure is applied to the rubber, or plastic material within the die cavity.

Figure 5:
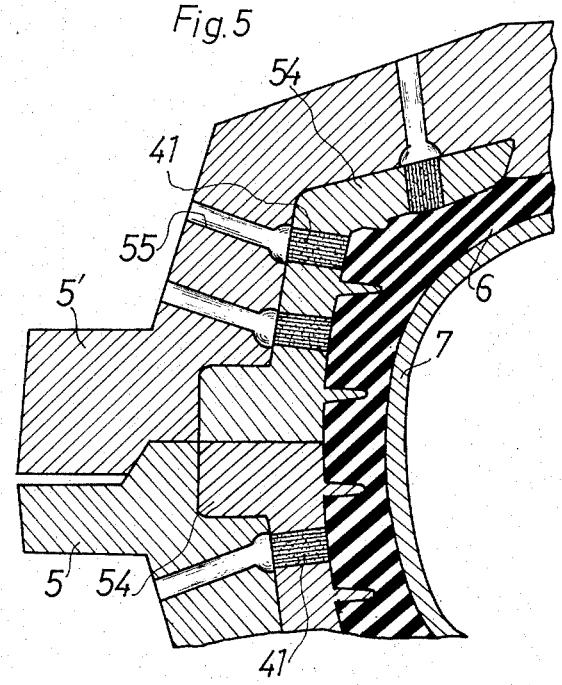
FIG. 5 is a cross-sectional view of tire forming moulds according to another embodiment of the invention.
Figure 4:
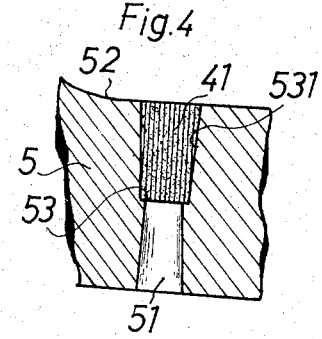
FIG. 4 is a fragmentary enlarged cross-sectional view of the tire mould and a sintered filter body mounted therein.

The sinterd filter bodies may be rigidly mounted in the die or mould walls by producing through-holes 51 of a suitable diameter (such as, for instance, of from 5 mm. to 30 mm.), followed by fitting said filters into the through-holes 51, as shown in FIG. 4. Alternatively, the sintered filter bodies may be placed in a casting mould so as to cast thereabout a die, or mould body 54, as shown in FIG. 5, integral with the sintered filter bodies.

These and other features of the present invention will now be described in further detail by way of examples embodying the present invention and using tire forming moulds with reference to FIGS. 1 to 5.

Figure 1:
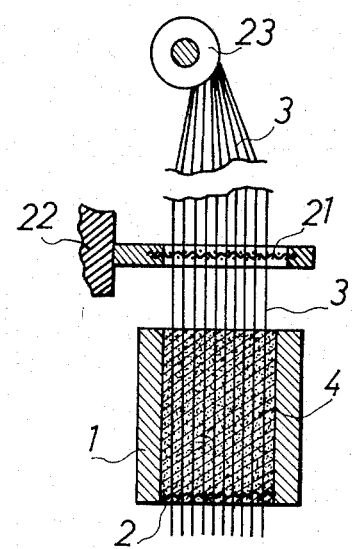
FIG. 1 is a cross-sectional view of apparatus for forming filters to be incorporated in a mould according to the invention.

Referring to the fabrication of a sintered filter body having linear air venting holes, there is disposed a plurality of copper wires 3 in a graphite mould 1, as shown in FIG. 1, with the wires extending through apertures in stainless steel screens 2 and 21. Iron powder 4 is poured into the graphite mould 1, and the upper and lower portions of the copper wires protruding from the mould 1 are subsequently cut off and removed. More specifically, a plurality of copper wires 3 thus disposed extends through both a metal screen 2 affixed to the lower portion of the mould 1 therein and a metal screen 21 fixedly mounted to a stationary frame 22, while being maintained under tension by an upper roller 23 and a lower holding means (not shown), so that the wires are aligned parallel to each other with the aid of both metal screens. In the illustrated process of making a filter, the number of copper wires used was 100, and their diameter was 0.04 mm., the mesh size of the iron powder was 150 and the inner diameter of the graphite mould was 10 mm.

Figure 2:
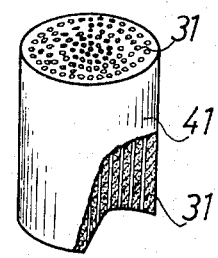
FIG. 2 is a perspective view of a sintered filter body formed as in FIG. 1 with a portion thereof cut away to reveal linear air venting holes.

After tensioning the wires, the iron powder 4 is filled around the copper wires 3 in the graphite mould 1, which is, in turn, placed in a sintering furnace and preheated to 900°C for 30 minutes. Then, the sintered body thus pre-heated and containing copper wires 3 therein is taken out of the mould 1 and cut to the predetermined length, followed by further heating to 1,100°C for 1 hour to thereby sinter the iron powder 4. At this time, the copper wires 3 melt and infiltrate into the sintered body 41 of a cylindrical shape as shown in FIG. 2. This filter 41 is about 10 mm., in diameter and 20 mm., long, having a plurality of air venting holes 31 therethrough at positions corresponding to original placement of the copper wires 3. The 100 air venting holes formed in the filter are parallel to the axis of the cylindrical filter body and each has a diameter of 0.04 mm. The resultant filter 41 has higher density and higher strength and the inner surfaces of the holes are smoothed because the gaps in the sintered material are filled by infiltration of copper from the wires. Preferably, the wires used are straight and of round cross-section.

Turning now to the step of mounting the filters 41 in the tire forming moulds, there are provided, as shown in FIGS. 3 and 4, through-holes 51 in the mould walls at all locations which require air venting. The filters are then fitted into said through-holes 51 from the side of mould surfaces 52 and 52'.

The through-holes 51 are each formed with a portion 531 tapered inwardly from the mould surface 52 toward the outside of the mould and with shoulder portions 53 provided substantially in the center portion thereof. Accordingly, when the filter 41 is inserted into one of the holes 51, the lower edge of the filter, as viewed in FIG. 4, will abut the shoulder portion 53, while the lower side of the filter 41 will be tightly fitted in the tapered hole portion 531 which has a minimum diameter somewhat smaller than that of the filter.

When forming a tire by using the forming moulds having the described air venting means, the air being trapped between the rubber material 6 and the mould surfaces 52 will readily be removed, or discharged through the filter 41 because of the plurality of linear air venting holes. The extremely small diameter of the air venting holes 31 aids in preventing the rubber material from entering the air holes, enabling the discharge of the air only, and usually eliminates the clogging of the air venting means. This also avoids the need for complicated and time consuming operations after each moulding cycle of removing minute rubber projections both from the venting means and from the surface of the formed product. As a result, mass production at a saving in cost is obtained. In addition, the forming dies or moulds of this type may be used repeatedly, and even if clogging should occur, the construction permits the filters to be easily removed and replaced by new filters.

In the special case of using high forming pressure, or of high forming temperature, the rubber material may enter the air filter venting holes. However, the rubber will not enter the holes deeply due to the smallness of their diameters. So the rubber projections, if any, will be very tiny, and they will be easily removed from said air venting holes without clogging because the holes are linear and the projections are very short. If any rubber projections are formed on the tires, they will be so small and short that it will be unnecessary to remove them.

For the purpose of removing any tiny rubber projections that may be formed in the filter air venting holes, it is preferred that the holes be straight and have smooth inner surfaces and round cross-sections.

FIG. 5 shows another embodiment of the present invention. Generally, a portion 54 of the mould 5 or 5' for forming a tire tread is made of aluminum. In this case, it is possible that filters 41 may be mounted in a cavity for forming portion 54 beforehand at positions corresponding to through-holes 55 provided in a mould body 5 or 5' and then the melt of aluminum is poured and cast therein, so that portion 54 of the mould when formed integrally incorporates filters for air venting.

Filters used in the present invention may also be manufactured by axially drilling a plurality of holes into a cylindrical body of solid metal, and then hot-drawing such a cylindrical metal body in an axial direction to provide a reduced cross-sectional area at a right angle to the axis of the metal.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

We claim:

1. A die or mould for forming a rubber or plastic material, comprising a body having a forming surface and an outer surface, at least one through-hole extending from said forming surface to the outer surface of said body, and a filter mounted in each of said through-holes for venting air or gases, said filter being a sintered matrix body composed of a sintered powder selected from the group consisting of metals and ceramics and an infiltrated metal different from said selected sintered powder deposited in the gaps of the sintered powder, and said filter being formed with a large number of straight linear vent holes having a diameter ranging between 0.01mm and just less than 0.1mm, said vent holes passing through said sintered matrix body and being parallel to each other.

2. A die or mould according to claim 1, wherein said filter is cylindrical and said linear vent holes of the filter have round cross-sections and smooth inner surfaces.

3. A die or mould according to claim 2, wherein said linear venting holes are parallel to the axis of said cylindrical filter.

4. A die or mould according to claim 1, wherein said sintered matrix is made of iron powder and infiltrated with copper.

5. A die or mould according to claim 1, wherein the density of said vent holes is at least one hundred holes in an area of the filter having a diameter of 10mm.

6. A die or mould according to claim 1, wherein said infiltrated metal is deposited in the gaps of the sintered metal at least throughout the wall portions surrounding said vent holes.

* * * * *